(12) United States Patent
Robertson

(10) Patent No.: US 9,367,270 B1
(45) Date of Patent: Jun. 14, 2016

(54) METHOD AND SYSTEM FOR SHUTTLING CLIENT RESIDENT DATA TO SERVERS IN A CLIENT-SERVER PRINTING ENVIRONMENT

(71) Applicant: Xerox Corporation, Norwalk, CT (US)

(72) Inventor: Alan Kenneth Robertson, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 14/613,856

(22) Filed: Feb. 4, 2015

(51) Int. Cl.
*G06F 3/12* (2006.01)
*G06F 3/048* (2013.01)
*G06F 9/44* (2006.01)
*G06K 15/02* (2006.01)
*G06K 15/00* (2006.01)

(52) U.S. Cl.
CPC .............. *G06F 3/1225* (2013.01); *G06F 3/048* (2013.01); *G06F 3/123* (2013.01); *G06F 3/1204* (2013.01); *G06F 3/1242* (2013.01); *G06F 3/1288* (2013.01); *G06F 9/4411* (2013.01); *G06K 15/005* (2013.01); *G06K 15/1889* (2013.01); *G06K 15/4005* (2013.01)

(58) Field of Classification Search
None
See application file for complete search history.

(56) References Cited

U.S. PATENT DOCUMENTS

| | | | |
|---|---|---|---|
| 6,940,614 B2 | 9/2005 | Subramaniam | |
| 6,985,600 B2 | 1/2006 | Rhoads et al. | |
| 7,027,179 B2 | 4/2006 | Mori | |
| 8,330,980 B2 | 12/2012 | Sorrentino et al. | |
| 8,456,666 B2 | 6/2013 | Salgado et al. | |
| 8,711,390 B2 | 4/2014 | Yagita et al. | |
| 2005/0111047 A1 | 5/2005 | Rhoads | |
| 2006/0053119 A1* | 3/2006 | Aden | G06Q 10/10 |
| 2007/0291319 A1 | 12/2007 | Shang | |
| 2012/0127512 A1 | 5/2012 | Kay et al. | |
| 2013/0148145 A1* | 6/2013 | Salgado | G06F 3/1205 358/1.13 |
| 2014/0207973 A1 | 7/2014 | Robertson et al. | |
| 2014/0259178 A1 | 9/2014 | Karaa et al. | |
| 2014/0279581 A1* | 9/2014 | Devereaux | G06Q 50/184 705/310 |

OTHER PUBLICATIONS

Hill, B., "Strategies for App Communication between Windows * 8 UI and Windows 8 Desktop," Intel, https://software.intel.com/en-us/articles/strategies-for-app-communication-between-windows-8-ui-and-windows-8-desktop, May 10, 2013, 4 pages.

* cited by examiner

*Primary Examiner* — Beniyam Menberu
(74) *Attorney, Agent, or Firm* — Kermit D. Lopez; Luis M. Ortiz; Ortiz & Lopez, PLLC

(57) ABSTRACT

A print driver's feature selection GUI can thus be utilized by a user to initiate a special, private print job when the user selects a feature, such as a picture Watermark, which is dependent on one or more files which are only present on the client (e.g., a client PC or other client computing device in a client-server printing environment). That private print job is used in a novel way as disclosed herein to "shuttle" the file to the print server. The print server interprets these private jobs in a special manner and caches the files contained within for use by subsequent normal print jobs. Unlike a normal print job, nothing will be sent to the printer in the case of these private print jobs.

20 Claims, 3 Drawing Sheets

METHOD AND SYSTEM FOR SHUTTLING CLIENT RESIDENT DATA TO SERVERS IN A CLIENT-SERVER PRINTING ENVIRONMENT

TECHNICAL FIELD

Embodiments are generally related to print servers and client-server printing environments. Embodiments are additionally related to feature selection GUI (Graphical User Interface) applications utilized in client-server printing environments.

BACKGROUND OF THE INVENTION

Print driver software has been implemented, which includes value-added features that satisfy a wide range of requirements from graphics arts to enterprise applications and production environments. Some of these features require innovative implementations because they extend beyond the bounds envisioned for standard print drivers. Some customers and users depend upon these features, which can provide a competitive advantage. Despite a need for solutions in this area, little development has taken place.

One such popular feature is watermarking (also known as annotations). The print driver provides options within its feature selection GUI to enable a user to add text and/or bitmap annotations as an overlay or underlay on each printed page. These annotations are applied by the driver and do not depend on the application from which the user is printing. Typical uses include adding a company logo, a timestamp, a note such as "Draft" or "Confidential", or a background image.

Text watermark features have been implemented that allow for the selection of any font available on the user's client PC. The picture watermark feature is typically used with local image files resident on the user's client PC. The problem is that client-server printing is widely employed by users of, for example, Windows® based client devices, and when rendering occurs via a remote print server, the print server needs access to the original font and/or image files which are located on the user's client computing device (e.g., PC). Note that Windows® is a registered trademark of Microsoft Corporation.

Unfortunately, current Windows® based software does not provide any built-in means to enable print driver software running on the client PC to add these files into the print job or to otherwise make them available to the code executing on the print server. For clarification, it should be understood, however, that this limitation is specific to the new Version 4 print architecture.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide a method and system for shuttling client resident data to servers in a client-server printing environment.

It is another aspect of the disclosed embodiments to provide for a print driver's feature selection GUI (Graphical User Interface) to initiate a special private print job when the user selects a feature that depends on one or more files that are only present on the client.

The aforementioned aspects and other objectives and advantages can now be achieved as described herein. Methods and systems are disclosed for shuttling client resident data to a print server in a client-server environment. In general, one or more features (e.g., print features) can be selected via a client that communicates with a print server. An operation can be performed to identify particular files needed by the print server for rendering of the feature(s) via the print server, wherein the particular files are present and available only on the client as client resident data. (Note that the software running on the client can accurately determine which fonts and images, for example, are required to print the job, but the client may not have any generally reliable means of determining whether the print server has copies or not. So the client has to be conservative and shuttle any files to the server that may be needed.)

One or more print jobs can then be transmitted to the print server from the client, wherein the print job(s) includes the particular files, in response to determining if the particular files are needed by the print server. An operation can then be performed to extract and cache at the print server, the feature(s) and the particular file(s) from the print job for subsequent use (e.g., rendering of the feature(s) with the particular files via the print server).

A print driver's feature selection GUI can thus be employed by a user via a client to initiate a special, private print job when the user selects a feature, such as a picture Watermark, which is dependent on one or more files which are only present on the client (e.g., a client PC or other client computing device in a client-server printing environment). That private print job is used in a novel manner as disclosed herein to "shuttle" the file to the print server. The print server interprets these private jobs in a special manner and caches the files contained within for use by subsequent normal print jobs. Unlike a normal print job, nothing will be sent to the printer in the case of these private print jobs.

Additionally, the client can be configured with instructions that keep track of which files have recently been shuttled to the server in order to optimize and avoid sending the same files over and over if the user visits the GUI, but prints multiple jobs with similar settings.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

The disclosed embodiments provide for a print driver's feature selection GUI to initiate a special, private print job when the user selects a feature, such as a picture Watermark, which is dependent on one or more files which are only present on the client (e.g., a client PC or other client computing device in a client-server printing environment). That private print job is used in a novel way as disclosed herein to "shuttle" the file to the print server. The print server interprets these private jobs in a special manner and caches the files contained within for use by subsequent normal print jobs. Unlike a normal print job, no output would be produced by the printer in the case of these private print jobs.

Note that reference is made herein to Windows® software and components. It should be appreciated that any reference to Windows® software and components is for illustrative purposes and is not considered a limiting feature of the disclosed embodiments. That is, embodiments can be implemented in the context of, for example, non-Windows® or non "Windows" print drivers and client-server printing environments. The discussion herein is focused on Microsoft Windows® because that is where the present inventors encountered a specific problem to solve, but such embodiments can be applied to other operating systems as well.

In the version-4 print architecture introduced in Windows 8, for example, it is quite common for no non-Windows or non-Microsoft code to be executed on the client PC in a client-server printing environment (aka "Point-and-Print"). The user clicks the "Print" button, the app coordinates with the Windows® print spooler to generate a spool file in an intermediate format, and Windows® transfers that spool file to the print server where such code is finally invoked to render that in to a printer-ready format such as PostScript.

This is a major problem because an opportunity is not available to add the required resources, such as font and/or image files before it leaves the client. Because the application has no knowledge of the print driver's Watermark feature, the application cannot assist in solving this problem. The disclosed embodiments therefore provide a solution to this problem. The key tradeoff is that it requires storage space for a user's files to be cached on print servers, but this tradeoff is highly advantageous because it relies only on very fundamental operating system capabilities, which are unlikely to be altered or restricted.

Figure 1:
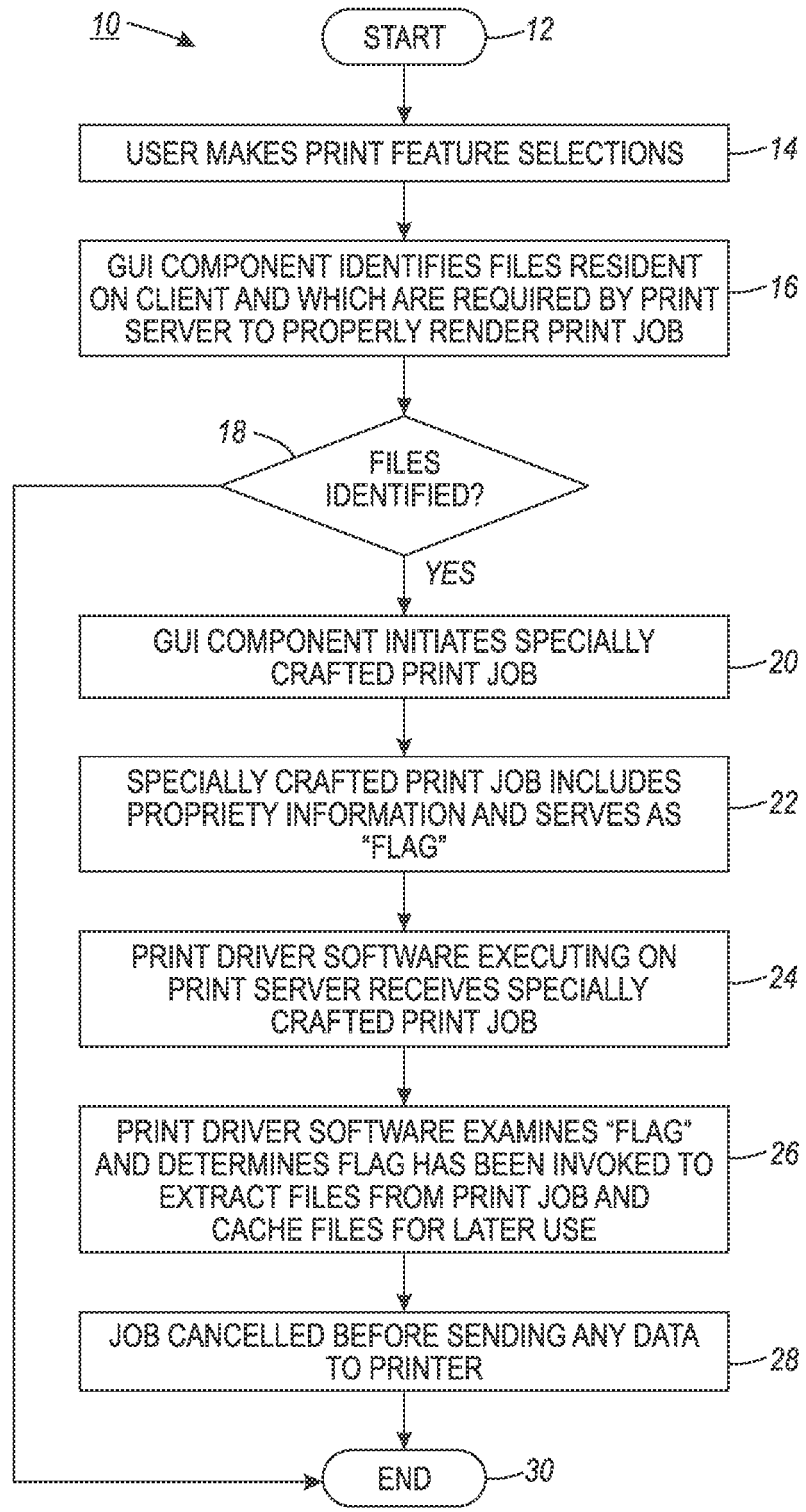
FIG. 1 illustrates a high level flow chart depicting logical operational steps of a method for shuttling client resident data to a server in the context of a client-server printing environment, in accordance with a preferred embodiment.

FIG. 1 illustrates a high level flow chart depicting logical operational steps of a method 10 for shuttling client resident data to a server in the context of a client-server printing environment. The novel solution offered by the disclosed embodiments is composed of steps or logical operations that can occur after a user invokes a print driver's feature section GUI (Graphical User Interface) component to specify the print features that the user wishes to use. Thus, as indicated at block 12, the process is initiated. Note that the term "shuttling" as utilized herein refers to the sending of a specially crafted job (e.g., a print job) with the embedded files, "flag," and so on, as described in greater detail herein.

As depicted next at block 14, a user can make his or her print feature selections. When the user finishes making the print feature selections, the GUI component identifies any files which are resident on the client and which will be required by the print server in order to properly render print job(s) to the printer-ready format, as indicated at block 16.

Note that the software running on the client can accurately determine what fonts and Images are required to print the job, but the client does not have any generally reliable means of determining whether the print server has copies or not. So the client has to be conservative and shuttle any files to the server that may be needed.

A test can then be performed, as shown at block 18, to determine if the files have been identified. If any such files are identified, then the GUI component initiates a specially crafted print job, as depicted at block 20.

Note that this print job houses the required client-resident files and "shuttles" them to the print server. This feature can be achieved in a number of ways, but in one example embodiment, the job can contain a dummy page that exists simply to reference the required files so they may be included in the job without risk of the print spooler discarding them because they appeared to be unreferenced orphans.

This specially crafted print job can also include proprietary information, serving as a "flag" as depicted at block 22, which can instruct the print driver software (i.e., the "print driver") executing on the print server to extract and cache the files in question for later user instead of immediately sending output to the printer. As described at block 24, the print driver software executing on the print server receives that specially crafted job. The print driver then examines the "flag" as indicated at block 26 and determines if the flag has been invoked to extract files from the job and cache them for later use. The print driver can then cancel the job as shown at block 28 before sending any data to the printer.

It is important for the server to associate these files only with the specific user that owns them and to protect the files with appropriate access rights. It might even make sense to encrypt them in some embodiments, these files can be encrypted for greater security. Note that an implementation will also need to manage the size of the cache and probably purge items, which have not been used in a long time. The user can now freely print one or more jobs without being required to open the print driver's feature selection GUI because the required files have already been cached on the print server. When the print server receives jobs from this user, for example, it will check its cache, and find and use the files previously saved therein in order to properly render the jobs.

Figure 2:
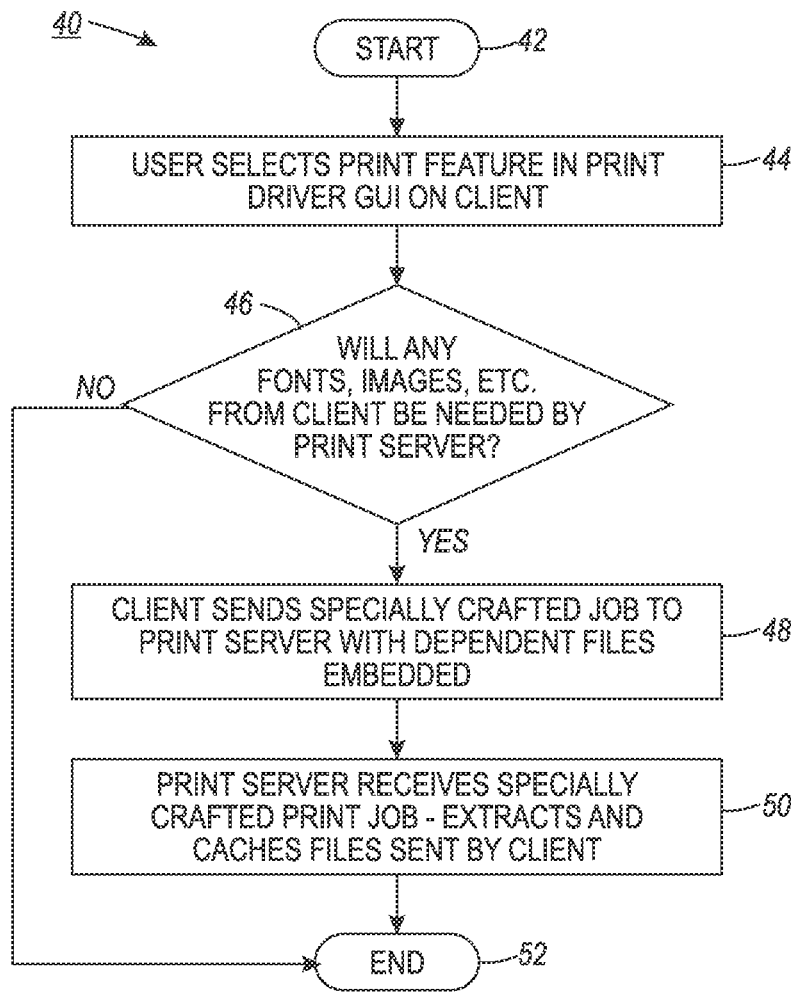
FIG. 2 illustrates a high level flow chart depicting logical operational steps of a method for shuttling client resident data to a server in the context of a client-server printing environment, wherein the data is cached rather than sending output to the printer, in accordance with an alternative embodiment.

FIG. 2 illustrates a high level flow chart depicting logical operational steps of a method 40 for shuttling client resident data to a server in the context of a client-server printing environment, wherein the data is cached rather than sending output to the printer, in accordance with an alternative embodiment. Note that the operations shown at FIG. 2 of method 40 are similar but slightly different from the operations of method 10 depicted in FIG. 1.

As indicated at block 42, the process can be initiated. Thereafter, as shown at block 44, a step or logical operation can be implemented in which a user selects print features in the print driver GUI on the client (e.g., a client PC or other client computing device). Next, as shown at decision block 46, an operation can be performed to determine if any fonts, images, etc., from the client are needed by the print server. As indicated previously, the software running on the client can accurately determine the particular fonts and images required to render the print job, but the client does not have any generally reliable means of determining whether the print server has copies or not. So the client has to be conservative and shuttle any files to the server that may be needed.

If not, then the process terminates, as shown at block 52. If it is determined that such fonts, images, etc., are needed by the print server, then as depicted at block 48, the client sends the specially crafted print job to the print server with the files embedded therein. Next, as illustrated at block 50, the print server receives the specially crafted print job and extracts and caches files sent by the client. The process can then terminate, as indicated at block 52.

Note that the client resident files needed to implement the user's selected print settings are now available on the server so the user can send one or more print jobs with these settings and the print server will be able to support the requested features. Another feature that can be implemented in accordance with an embodiment is the ability to track which files/data have been shuttled to the print server previously. That is, the client can be configured with instructions that keep track of which files have recently been shuttled to the server in order to optimize and avoid sending the same files over and over if the user visits the GUI, but prints multiple jobs with similar settings.

One of the key advantages of the disclosed approach is that it provides an alternative, which has no dependencies on any particular operating system capabilities other than the ability to create and send a simple print job. This minimizes dependencies on the current implementation of Windows®, which is ever changing.

Note that Microsoft introduced "Windows Store Applications" in Windows 8. This new variety of Windows applications are written using a different API set than traditional Windows® applications. They execute within a tightly controlled sandbox, are intentionally isolated from other applications, and are only permitted to use a limited number of operating system APIs.

Print drivers that need to provide a customized GUI when invoked by a Windows® Store App, for example, must implement a second, independent GUI component. Unfortunately, it appears that it is not possible for any Windows® Store App, including the some print driver's GUI component for Windows® Store Apps, to silently initiate a print job. Therefore, in some embodiments an additional helper component can be installed with the print driver software on the client.

The disclosed GUI component, for example, can be configured to identify the required client-resident files (e.g., fonts, images, etc.) and record that list, along with the username and print queue name. The helper component can run in the background and register to be notified (or poll) for changes to the shared data. When a change is detected, the helper component can read shared data, parse the data, find the list of files, the username, and the print queue name. Finally, the helper component can send a specially crafted print job (as described above) to that queue on behalf of the GUI. In a particular embodiment, while the helper component is running in the background, if a change in shared data maintained in a suitable location (e.g., such as the "cloud") is detected, an operation can be implemented to automatically instruct the helper component to read shared data, parse data, find the list of files, and the username and the print queue name, and send the specially crafted print job to a print queue associated with the print queue name.

Note that the term "cloud" as utilized herein refers generally to "cloud computing," which is a computing terminology or metaphor based on the utility and consumption of computing resources. Cloud computing involves deploying groups of remote servers and software networks that allow centralized data storage and online access to computer services or resources.

It is important to note that in some embodiments, computer program code for carrying out operations of the disclosed embodiments may be written in an object oriented programming language (e.g., Java, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a users computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture Illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 3:
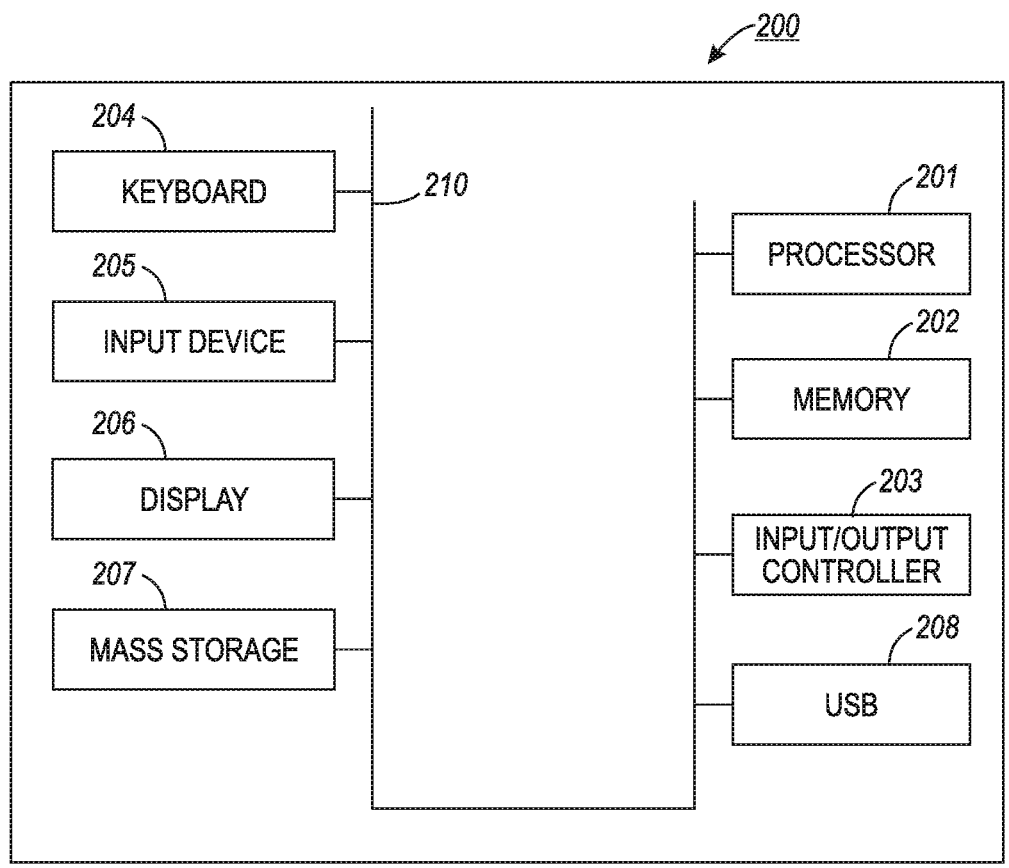
FIG. 3 illustrates a schematic view of a computer system, in accordance with an embodiment.
Figure 4:
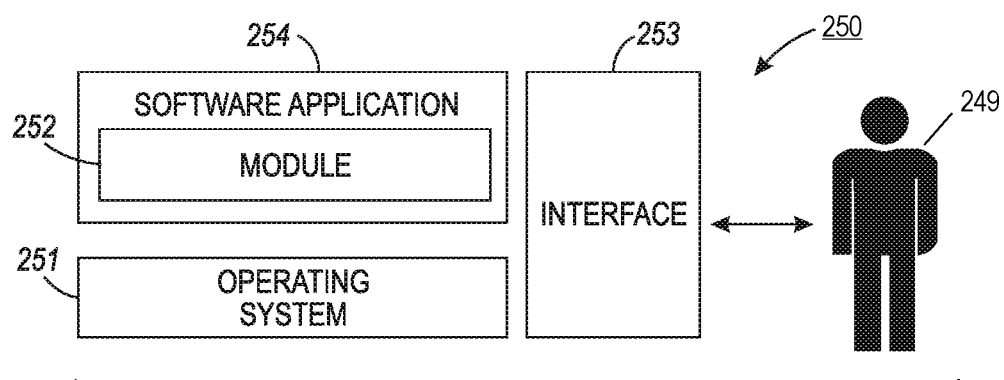
FIG. 4 illustrates a schematic view of a software system including a module, an operating system, and a user interface, in accordance with an embodiment.

FIGS. 3-4 are shown only as exemplary diagrams of data-processing environments in which embodiments may be implemented. It should be appreciated that FIGS. 3-4 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 3, some embodiments may be implemented in the context of a data-processing system 200 that can include one or more processors such as processor 201, a memory 202, an input/output controller 203, a peripheral USB—Universal Serial Bus connection 208, a keyboard 204, an input device 205 (e.g., a pointing device, such as a mouse, track ball, pen device, etc.), a display 206, and in some cases, mass storage 207. Data-processing system 200 may be, for example, a client computing device (e.g., a client PC, laptop, tablet computing device, etc.) which communicates with a print server (not shown) via a client-server network (e.g., wireless and/or wired). In some embodiments, the data-processing system 200 may actually be a print server that communicates with one or more printers (not shown).

As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc. Data-processing system 200 may be implemented as, for example, a server in a client-server based network (e.g., the Internet) or can be implemented in the context of a client and a server (i.e., where aspects are practiced on the client and the server). Data-processing system 200 may be, for example, a standalone desktop computer, a laptop computer, a Smartphone, a pad computing device and so on.

FIG. 4 illustrates a computer software system 250 for directing the operation of the data-processing system 200. Software application 254 stored, for example, in memory 202, generally includes a kernel or operating system 251 and a shell or interface 253. One or more application programs, such as software application 254, may be "loaded" (i.e., transferred from, for example, mass storage 207 or other memory location into the memory 201) for execution by the data-processing system 200. The data-processing system 200 can receive user commands and data through the interface 253; these inputs may then be acted upon by the data-processing system 200 in accordance with instructions from operating system 251 and/or software application 254. The interface 253 in some embodiments can serve to display results, whereupon a user 249 may supply additional inputs or terminate a session. The software application 254 can include a module(s) 252 that can, for example, implement instructions or operations such as depicted in FIG. 1-2.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 3-4 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing; it can be appreciated that a number of embodiments are disclosed, preferred, and alternative. For example, in one embodiment, a method for shuttling client resident data to a print server in a client-server environment can be implemented. Such a method can include, for example, the steps or logical operations of selecting one or more features via a client that communicates with a print server; identifying particular files required by the print server for rendering of the feature(s) in at least one print job via the print server, wherein the particular files are present and available only on the client as client resident data; and shuttling the particular files from the client to the print server if it is determined that the particular files including the feature(s) are required by the print server for rendering of the feature(s) via the print server in print job (or jobs). The particular files and data therein can be extracted and cached at the print server for subsequent use by the print server in rendering of the print job including the feature(s).

In another embodiment, a step or logical operation can be provided for transmitting to the print server the print job for rendering of the print job by the print server, wherein the print job is rendered with the particular files and the data extracted by the print server. In yet another embodiment, a step or logical operation can be provided for associating the particular files with a particular user.

In still another embodiment, a step or logical operation can be implemented for tracking which files among the particular files have been recently shuttled to the print server so as to optimize and avoid sending the same files over again from the client to the print server. In yet another embodiment, a step or logical operation can be implemented for rendering the feature(s) with the particular files via the print server after extracting and caching at the print server the feature(s) and the particular iles from the print job(s).

In some embodiments, the print job can constitute a specially crafted print job that includes proprietary information that instructs the print server to extract and cache data associated with particular files for later use by the print server in rendering of the print job(s). In another embodiment, a step or logical operation can be provided for authenticating the particular files and data contained within the particular files in order to render the print job(s) via the print server.

In still another embodiment, a step or logical operation can be provided for installing a helper component with a print driver on the client that assists in identifying the particular files required by the print server and recording a list of the particular files in association with a username and a print queue name. In yet another embodiment, a step or logical operation can be implemented for running the helper component in the background; and if a change in shared data maintained in a suitable location is detected, the helper component (e.g., a helper "app") will read shared data, parse data, find the list of the particular files, the username and the print queue name, and send the print job(s) to a print queue associated with the print queue name.

In another embodiment, a system can be implemented for shuttling client resident data to a print server in a client-server environment. Such a system can include, for example, one or more processors; and a computer-usable medium embodying computer program code, the computer-usable medium capable of communicating with the processor(s). The computer program code can include instructions executable by the processor(s) and configured, for example, for: selecting at least one feature via a client that communicates with a print server; identifying particular files required by the print server for rendering of the feature(s) in at least one print job via the print server, wherein the particular files are present and available only on the client as client resident data; and shuttling the particular files from the client to the print server if it is determined that the particular files including the feature(s) are required by the print server for rendering of the feature(s) via the print server in the print job(s).

In another system embodiment, the particular files and data therein can be extracted and cached at the print server for subsequent use by the print server in rendering of the print job(s) including the feature(s). In yet another embodiment, such instructions can be further configured for transmitting to the print server the print job(s) to the print server for rendering of the print job(s) by the print server, wherein the print job(s) is rendered with the particular files and the data extracted by the print server. In still another embodiment, such instructions can be further configured for associating the particular files with a particular user.

In still another embodiment, such instructions can be further configured for automatically tracking which files among the particular files have been recently shuttled to the print server so as to optimize and avoid sending the same files over again from the client to the print server. In another embodiment, such instructions can be further configured for rendering the feature(s) with the particular files via the print server after extracting and caching at the print server the feature(s) and the particular files from the print job(s).

In yet another embodiment, the print job(s) can constitute a specially crafted print job that includes proprietary information that instructs the print server to extract and cache data associated with particular files for later use by the print server in rendering of the print job(s). In still another embodiment, such instructions can be further configured for authenticating the particular files and data contained within the particular files in order to render the print job(s) via the print server.

In another embodiment, such instructions can be further configured for installing a helper component with a print driver on the client that assists in identifying the particular files required by the print server and recording a list of the particular files in association with a username and a print queue name. In yet another embodiment, such instructions can be further configured for running the helper component in the background; and if a change in shared data maintained in a suitable location is detected, the helper component will read shared data, parse data, find the list of the particular files, the username and the print queue name, and send the print job(s) to a print queue associated with the print queue name.

In some embodiments, for example, module(s) 252 can provide or facilitate the shuttling of client resident data to a print server in a client-server environment. Module 252 can include instructions, for example, for selecting one or more features via a client that communicates with a print server; identifying particular files required by the print server for rendering of the feature(s) in at least one print job via the print server, wherein the particular files are present and available only on the client as client resident data; and shuttling the particular files from the client to the print server if it is determined that the particular files including the feature(s) are required by the print server for rendering of the feature(s) via the print server in print job (or jobs). The particular files and data therein can be extracted and cached at the print server for subsequent use by the print server in rendering of the print job including the feature(s).

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for shuttling client resident data to a print server in a client-server environment, said method comprising:
    selecting at least one feature via a client that communicates with a print server;
    identifying particular files required by said print server for rendering of said at least one feature in at least one print job via said print server, wherein said particular files are present and available only on said client as client resident data; and
    shuttling said particular files from said client to said print server if it is determined that said particular files including said at least one feature are required by said print server for rendering of said at least one feature via said print server in said at least one print job, wherein said at least one print job comprises a specially crafted print job that includes proprietary information that instructs said print server to extract and cache data associated with particular files for later use by said print server in rendering of said at least one print job.

2. The method of claim 1 wherein said particular files and data therein are extracted and cached at said print server for subsequent use by said print server in rendering of said at least one print job including said at least one feature.

3. The method of claim 1 further comprising transmitting to said print server said at least one print job for rendering of said at least one print job by said print server, wherein said at least one print job is rendered with said particular files and said data extracted by said print server.

4. The method of claim 1 further comprising associating said particular files with a particular user.

5. The method of claim 2 further comprising automatically tracking which files among said particular files have been recently shuttled to said print server so as to optimize and avoid sending the same files over again from said client to said print server.

6. The method of claim 2 further comprising rendering said at least one feature with said particular files via said print server after extracting and caching at said print server said at least one feature and said particular files from said at least one print job.

7. The method of claim 1 further comprising authenticating said particular files and data contained within said particular files in order to render said at least one print job via said print server.

8. The method of claim 1 further comprising:
    installing a helper component with a print driver on said client that assists in identifying said particular files required by said print server and recording a list of said particular files in association with a username and a print queue name.

9. The method of claim 8 further comprising:
    running said helper component in a background; and
    if a change in shared data maintained in a suitable location is detected, automatically instructing said helper component to read shared data, parse data, find said list of said particular files, said username and said print queue name, and assist in shuttling said at least one print job and embedded files to said print server managing a print queue associated with said print queue name.

10. A system for shuttling client resident data to a print server in a client-server environment, said system comprising:
- at least one processor; and
- a computer-usable medium embodying computer program code, said computer-usable medium capable of communicating with said at least one processor, said computer program code comprising instructions executable by said at least one processor and configured for:
  - selecting at least one feature via a client that communicates with a print server;
  - identifying particular files required by said print server for rendering of said at least one feature in at least one print job via said print server, wherein said particular files are present and available only on said client as client resident data; and
  - shuttling said particular files from said client to said print server if it is determined that said particular files including said at least one feature are required by said print server for rendering of said at least one feature via said print server in said at least one print job, wherein said at least one print job comprises a specially crafted print job that includes proprietary information that instructs said print server to extract and cache data associated with particular files for later use by said print server in rendering of said at least one print job.

11. The system of claim 10 wherein said particular files and data therein are extracted and cached at said print server for subsequent use by said print server in rendering of said at least one print job including said at least one feature.

12. The system of claim 10 wherein said instructions are further configured for transmitting to said print server said at least one print job for rendering of said at least one print job by said print server, wherein said at least one print job is rendered with said particular files and said data extracted by said print server.

13. The system of claim 10 wherein said instructions are further configured for associating said particular files with a particular user.

14. The system of claim 11 wherein said instructions are further configured for automatically tracking which files among said particular files have been recently shuttled to said print server so as to optimize and avoid sending the same files over again from said client to said print server.

15. The system of claim 11 wherein said instructions are further configured for rendering said at least one feature with said particular files via said print server after extracting and caching at said print server said at least one feature and said particular files from said at least one print job.

16. The system of claim 10 wherein said instructions are further configured for authenticating said particular files and data contained within said particular files in order to render said at least one print job via said print server.

17. The system of claim 10 wherein said instructions are further configured for installing a helper component with a print driver on said client that assists in identifying said particular files required by said print server and recording a list of said particular files in association with a username and a print queue name.

18. The system of claim 17 wherein said instructions are further configured for:
- running said helper component in a background; and
- if a change in shared data maintained in a suitable location is detected, automatically instructing said helper component to read shared data, parse data, find said list of said particular files, and said username and said print queue name, and assist in shuttling said at least one print job and embedded files to said print server managing a print queue associated with said print queue name.

19. A system for shuttling client resident data to a print server in a client-server environment, said system comprising:
- at least one processor; and
- a non-transitory computer-usable medium embodying computer program code, said non-transitory computer-usable medium capable of communicating with said at least one processor, said computer program code comprising instructions executable by said at least one processor and configured for:
  - selecting at least one feature via a client that communicates with a print server;
  - identifying particular files required by said print server for rendering of said at least one feature in at least one print job via said print server, wherein said particular files are present and available only on said client as client resident data;
  - shuttling said particular files from said client to said print server if it is determined that said particular files including said at least one feature are required by said print server for rendering of said at least one feature via said print server in said at least one print job; and
  - extracting and caching said particular files and data therein at said print server for subsequent use by said print server in rendering of said at least one print job including said at least one feature, wherein said at least one print job comprises a specially crafted print job that includes proprietary information that instructs said print server to extract and cache data associated with particular files for later use by said print server in rendering of said at least one print job.

20. The system of claim 19 wherein said instructions are further configured for associating said particular files with a particular user.

* * * * *